March 24, 1959 J. I. PANKOVE 2,879,405

SEMI-CONDUCTOR PHOTO-ELECTRIC DEVICES

Filed June 29, 1953 2 Sheets-Sheet 1

INVENTOR.
Jacques I. Pankove
BY Morris Rabkin
ATTORNEY

SEMI-CONDUCTOR PHOTO-ELECTRIC DEVICES

Filed June 29, 1953 2 Sheets-Sheet 2

INVENTOR.
Jacques I. Pankove
BY Morris A. Rabkin
ATTORNEY

United States Patent Office
2,879,405
Patented Mar. 24, 1959

2,879,405

SEMI-CONDUCTOR PHOTO-ELECTRIC DEVICES

Jacques I. Pankove, Princeton, N.J., assignor to Radio Corporation of America, a corporation of Delaware Application June 29, 1953, Serial No. 364,630

15 Claims. (Cl. 250—211)

This invention relates to semi-conductor devices and, more particularly, although not necessarily exclusively, to a photo-conductive device useful in target indicating or sensing in response to external illumination.

Previously known photo-cells comprise three basic types, photo-voltaic, photo-conductive, and photo-emissive. The photo-emissive type cell liberates electrons upon the impingement of light thereon. The photo-voltaic type cell generates an electrical current when light is directed thereon. The photo-conductive type cell requires the use of an external source of voltage and becomes operative when light is directed upon the cell. It has a relatively high internal ohmic resistance in the non-illuminated condition. Upon illumination the internal resistance of the cell is reduced. The more intense the light, the more current is permitted to flow through this cell.

It is an object of the present invention to provide means for producing an electrical output which is a known function of a light beam position with respect to a photo-conductive device.

It is another object of the present device to provide a photo-conductive cell which may be used in target location.

It is a still further object of the invention to provide an improved photo-conductive semi-conductor cell.

In accordance with the present invention, there is provided a body of semi-conducting material, such for example, as germanium, having one surface thereof coated with a semi-transparent film of metal. The film may be deposited by any suitable method, such as techniques in vacuo, as set forth more fully in applicant's copending applications Serial Number 259,233, filed November 30, 1951, now Patent No. 2,669,663, issued February 16, 1954, and 231,195, filed June 12, 1951, now Patent No. 2,650,258, issued August 25, 1953, and should be thin enough to transmit light readily, but sufficiently thick in cross section to offer little resistance to the passage of electric current. The resistance of the semi-transparent film is arranged to have a suitable distribution over the active surface of the cell. Electrical connection is or may be made to the metal film by means of an electrode secured in contact with the metal film. An electrical connection is also made to an uncoated surface of the body of semi-conducting material through another electrode. Resistance control is obtained by providing a film thickness of suitable value, or by properly designing the shape of the semi-transparent film or by selecting both the proper shape and thickness of this film. Application of a suitable potential to the electrodes of the device develops a uniform voltage drop which is a predetermined function of the distance measured from the electrode along the surface of the cell to the position on the surface at which a light beam is incident thereon so that the photo-sensitivity of the cell is inversely related to the electrode to light beam distance. The photo-current of a germanium photo-conductive cell is substantially proportional to the applied bias within an appreciable range. Since the bias varies as a function of the distance which separates the illuminated region of the cell from the connection to the surface film, the photo-current is a linear function of the beam position.

The novel features that are considered characteristic of the invention are set forth with particularity in the appended claims. The invention itself, however, both as to its organization and method of operation, as well as additional objects and advantages thereof, will be best understood from the following description when read in connection with the accompanying drawings, in which:

Figures 3, 4, 5, 6, 7, 7A, 8, 8A:
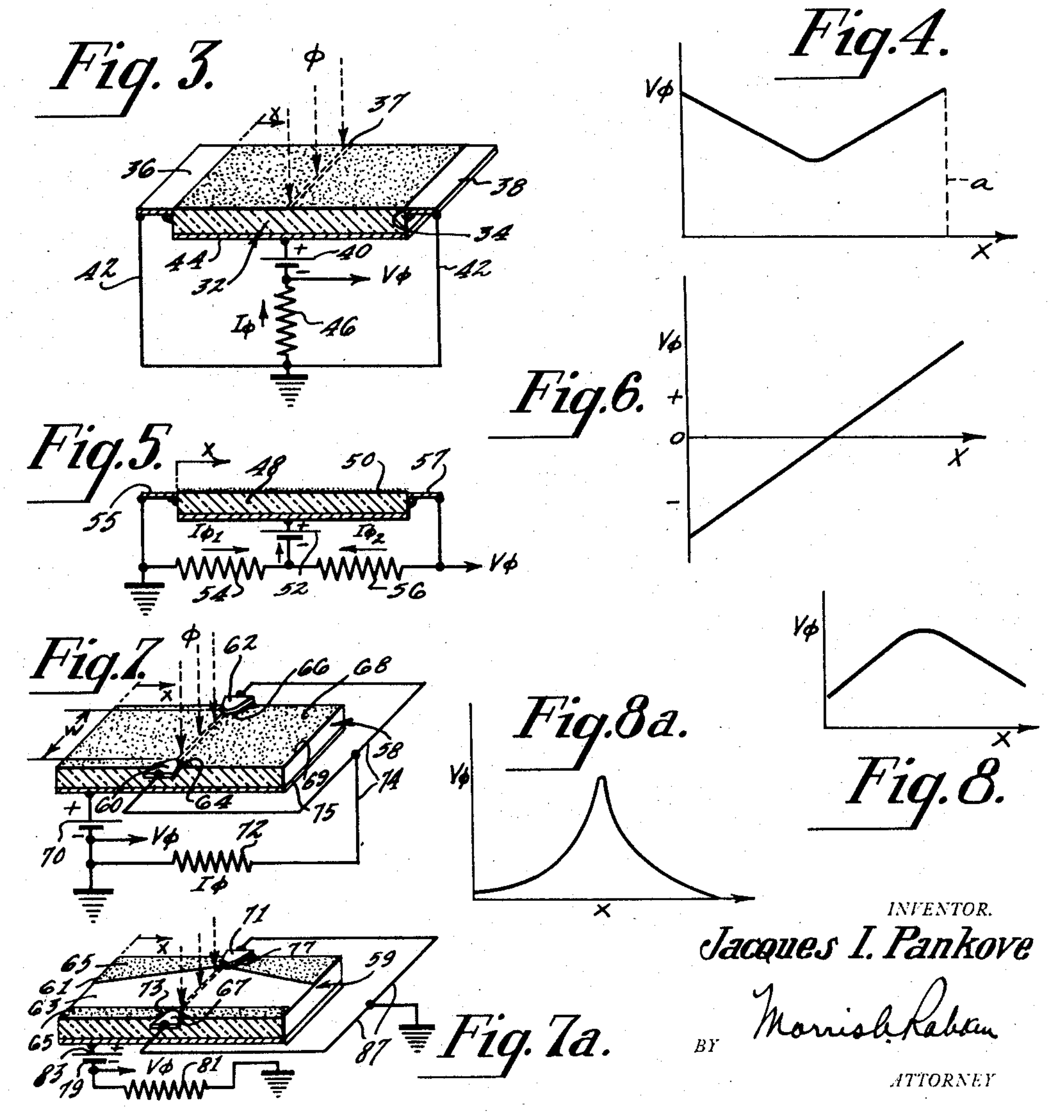
Fig. 3 is a schematic representation of the cell of Fig. 1 having two parallel connections to the surface film.
Fig. 4 is a graph having a curve of photo-current versus illuminating beam position exhibiting a minimum value.
Fig. 5 is a schematic diagram of a device similar to the device shown in Fig. 3.
Fig. 6 is a graph having curves representing a polar relationship between the photo-current and the position of the illuminating beam.
Fig. 7 is a schematic representation of a means utilizing the present invention for providing a target location.
Fig. 8 is a graph having a curve illustrating target location by means of a maximum signal indication.

Fig. 7*a* is a schematic drawing of another device utilizing this invention;

Fig. 8*a* is a graph having a curve illustrating the response of the device of Fig. 7*a*.

Figure 9:
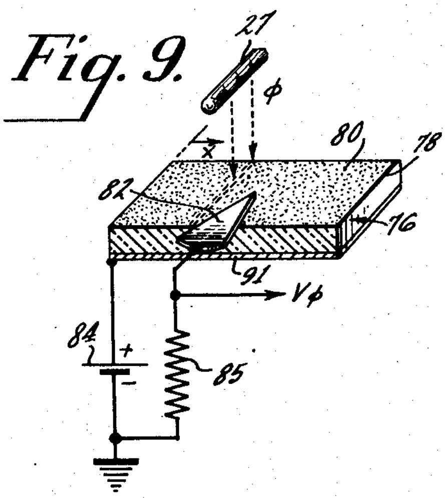
Figure 10:
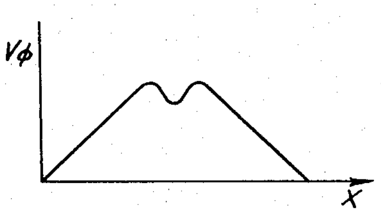
Figure 11:
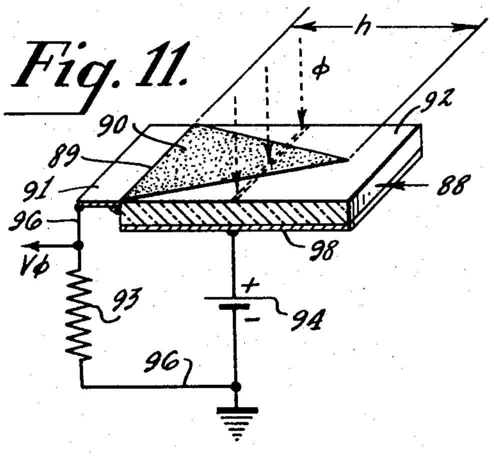
Figure 12:
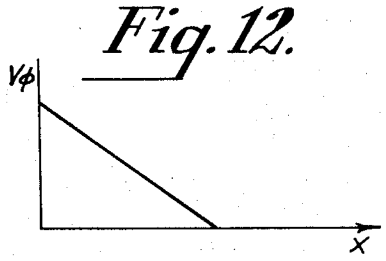
Figure 13:
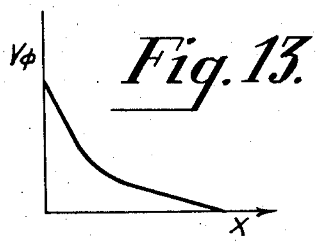

Fig. 9 is a schematic representation of a device similar to the device of Fig. 7 providing a more accurate target location means;

Fig. 10 is a graph having a curve illustrating the response output characteristics of the device shown in Fig. 9;

Fig. 11 is a schematic representation of a device utilizing the present invention in which the shape of the film is a function of the distance from the connection to the film; and Figs. 12 and 13, respectively, are graphs for the response of the photo device shown in Fig. 11 having, respectively, a low film resistance and high film resistance.

Figures 1, 2:
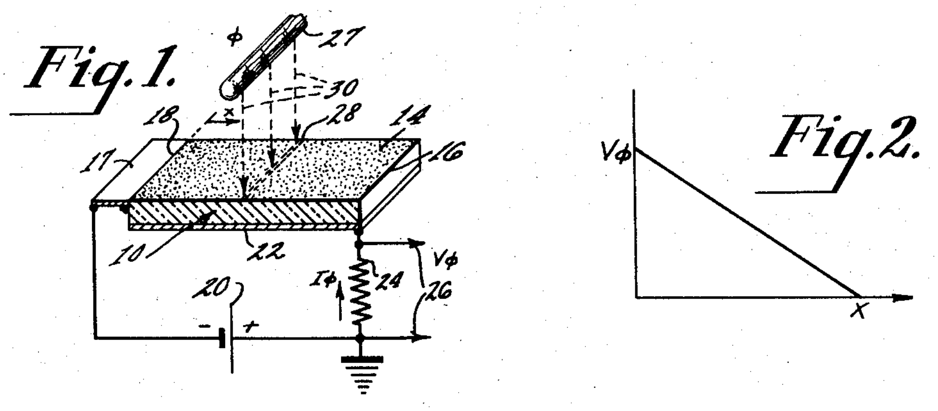
Fig. 1 is a schematic representation of a novel photo-conductive cell according to the present invention.
Fig. 2 is a graph having a curve representing the photo-current plotted against the light beam position.

Referring to Fig. 1, there is shown a body 10 of semi-conducting material capable of forming a barrier layer at a surface thereof which may be, for example, of N-type germanium. A thin, light-transmitting film of metal 14 is deposited on one of the exposed surfaces 16 of the semi-conducting body 10. The metal should preferably be beryllium, antimony or bismuth for it is found when any one of these metals is used, the cell acquires photo-conducting properties in the presence of a biasing voltage. However, a satisfactory performance can also be obtained with gold, nickel or copper as the film material. The thickness of the metal coating may vary considerably but is preferably such that about 10 percent to 40 percent of the incident light is transmitted. An electrode 17 is secured to one edge 18 of the surface film 14. The connection is negatively biased by means of the battery 20. The opposite surface of the body 10 is provided with a conductive base element 22 which is connected through an output impedance or resistance 24 to the positive side of the battery 20. Current output from the cell may thus be measured at the contacts 26. The resistance of the light-transmitting film 14 increases with increasing distance from the electrode 17.

In order to utilize the device of the present invention, the output leads 26 are, or may be, connected to any suitable utilization circuit such as a voltmeter, for example, while light from a source of illumination 27 having an intensity $\Phi$ is directed across the central portion 28 of the light-transmitting film 14, as indicated by the arrows 30. Advantage is taken of the uniform electrical and photo-sensitive characteristics of the so-called large area type germanium photo-conductive cells and also of the fact that the resistance of the semi-transparent film can be arranged to have a suitable distribution over the active surface of the cell.

Consider the following equation for the cell illustrated in Fig. 1. Let $I\phi$ be the photo-current flowing in the cell illuminated by an intensity $\Phi$, and let $f(\nu)$ be the cell's $I\phi$ dependance on the applied voltage, and let $g(R)$ be the cell's dependance on the film resistivity and let $x$ be the distance of the line of illumination from the connection to the film, then:

$$I\phi=\Phi f(\nu)[1-g(R)x]$$

Referring to the curve of Fig. 2, if $g(R)$ is a constant, corresponding to a film of uniform resistivity, then the photo-current may be represented as a linear function. In other words, there is a uniform voltage drop, proportional to $x$ which is the light beam position along the surface of the film so that the photo-sensitivity of the cell decreases with increasing $x$. The photo-current $I\phi$ flows through the resistor 24 to produce an output voltage $V\phi$ which is directly proportional to $I\phi$.

P-type semi-conductive material could of course be substituted in the example set forth above. In this latter case, the polarity of the bias connections from the battery 20 must be reversed.

An illumination seeking or light beam target locating device can be provided by means of the apparatus shown in Figs. 3 and 5 now to be described. Here target location corresponds to that alignment of the cell which yields a minimum signal.

Referring to Fig. 3, there is shown a schematic representation of a device utilizing the present invention in which a semi-conducting body 32 of N-type germanium has deposited on a portion thereof, a uniform metallic surface film 34 which is adapted to be semi-transparent. Two parallel connections are made to opposite edges of the surface film 34 by means of the electrodes 36 and 38. Negative bias for the surface film is obtained from the small battery 40 through the leads 42. The opposite surface 44 of the body 32 is placed in low resistance contact with the positive side of the battery 40 and includes the output impedance 46. The arrangement of Fig. 3 makes it possible to obtain a two-valued relation between the photo-current and the physical position of the illuminating beam, as shown by the curve of Fig. 4. Minimum signal is obtained when the illuminating beam is located midway between the electrode connections 36 and 38, as indicated by reference character 37.

Fig. 5 illustrates another device utilizing the present invention similar to the device of Fig. 3. A semi-conducting body 48 is shown having a semi-transparent metal film 50 on one surface thereof. The upper surface of the body 48 has a film 50 thereon which is negatively biased by means of the battery 52 and the output impedances 54 and 56. By using the two parallel connections to the film 50 through the electrodes 55 and 57, a polar relation between the output signal and the position of the illuminating beam is obtainable, as shown by the curve of Fig. 6. A larger photo-current flows through that electrode which is closest to the illuminated region. The photo-currents $I\phi_1$ and $I\phi_2$ flow in opposite directions in the two electrodes 55 and 57 and the two load resistors 54 and 56. Hence the output signal is the difference between the two ohmic drops across the two load resistors 54 and 56. When the beam is midway between the electrodes, the drops are equal hence, there is zero output signal.

Target location by means of obtaining a maximum signal response from a photo-conductive cell in response to the impingement of light thereon can be obtained from the arrangement illustrated in Fig. 7. A semi-conductive body 58 is provided with a semi-transparent metallic film 68 which has been previously deposited over a surface 69 thereof. A pair of adjacent electrodes 60 and 62 are secured to the centers of opposite edges 64 and 66 of the body 58. The parallel connection to the electrodes 60 and 62 is made to the battery 70 through the output impedance 72 by means of the leads 74. The opposite surface 75 of the semi-conducting body 58 is connected to the positive side of the battery 70. Maximum signal response with proximity of the source of illumination to the electrodes 60 and 62 is illustrated in the curve of Fig. 8. The smaller the actual area of contact provided by the electrodes 60 and 62 and the smaller the width $w$ is, the sharper will be the peak of the curve of Fig. 8.

An additional arrangement for the photo-electric device of Fig. 7 is the arrangement set forth in Fig. 7*a*. A semi-conductive member or body 59 is provided with a semi-transparent metallic film 61 which has been deposited over a surface 63 thereof. A substantially opaque layer of insulation 65 is then secured over the surface film 61 along two parallel portions of the surface 63. The insulation is or may be deposited so as to take the configuration substantially as shown. The wedge-shaped electrodes 67 and 71, which, in the illustrative example shown, are adapted to be negatively biased, are secured to opposite edge portions 73 and 77 of the surface film 61. Connections for the application of potential from a battery 79 to the electrodes 67 and 71 through an output impedance 81 are made by means of the leads 83 and 87. The arrangement of Fig. 7*a* offers an increasing sensitivity to light beam position as the light beam approaches the center of the semi-conducting body 59. The response characteristic for the device of Fig. 7*a* is set forth in the sharply peaked curve of Fig. 8*a*.

In order to provide a more accurate target locating device than can be obtained with the arrangement shown in Fig. 7, the novel arrangement of Fig. 9 is set forth. A semi-conductive body 76, one surface 78 of which has been provided with a semi-transparent film 80 is provided with a shadowing means 82. The shadowing means may consist of the electrical connection to the film 80. The shadowing means 82, which may, for example, be a triangular or wedge-shaped electrode, is biased negatively by means of a battery 84. An output impedance 85 is adapted to serially connect the battery 84 to the shadowing means 82.

The curve of Fig. 10 illustrates the photo-current response of the device of Fig. 9 as a function of light beam position. The response may be varied by altering the shape and position of the shadowing means 82.

As the shape of the semi-transparent film applied to the semi-conducting material is made to follow a certain function of distance from the connection to the film, a non-linear photo-current versus beam position relationship can be obtained. For example, in Fig. 11, there is shown a semi-conducting body 88 having, for example, a substantially wedge-shaped semi-transparent film 90 on one surface 92 thereof. One edge portion 89 of the film 90 is adapted to be biased negatively by means of an electrode 91 which is adapted to be connected through an output impedance 93 to the battery 94 through the leads 96. The opposite surface 98 of the semi-conducting body 88 is connected to the positive side of the battery 94. The variation in the physical area of the film 90 is an important factor. For a low film resistance i. e., a relatively thick metallic film, the curve of Fig. 12 shows the photo-response plotted against the illuminating beam position.

Here: $g(R)$ negligible $$I\phi=\phi_{(x)}f(\nu)$$

$$\phi_x=\phi_0\frac{(h-x)}{h}$$

$\phi_0$=active illumination at connection 89
$h$= height to triangular film For a high film resistance i.e., a relatively thin film, the quadratic curve of Fig. 13 is applicable.

Here: $g(R)$ not negligible $$\phi_{(x)}=\phi_0\frac{(h-x)}{h}$$

$$I\phi=\phi_0 f(\nu)\frac{(h-x)}{h}[1-g(R)x]$$

$$=\frac{\phi_0 f(\nu)}{h}[g(R)x^2+x(1-hg(R)+h]$$

Obviously, the gain provided for by the low resistance of a relatively thick metallic surface film results in a loss in light transmission through the film and vice versa.

Although the output would be extremely small the device of the present invention could also be operated as a photo-voltaic unit. In this case the battery would be omitted but the characteristic curves would remain the same in shape. There has thus been described a novel photo-electric device in the nature of a semi-conducting target designating apparatus.

What is claimed is:

1. An electrical device comprising a body of semi-conducting material capable of forming a barrier layer at a surface thereof, a light-transmitting film of a metal from the class consisting of antimony, bismuth, and beryllium on said surface of said material, said film having predetermined resistivity characteristics and adapted to receive light directed towards a portion of its surface, a pair of spaced electrodes secured to said metal film, said electrodes being connected in parallel, the resistance between said portion of said film and said electrodes varying as a function of the distance between said electrodes and said portion of said film, and means for applying a bias voltage between said body and said film.

2. An electrical device comprising a body of semi-conducting material capable of forming a barrier layer at a surface thereof and having on said surface a semi-transparent film of a metal from the class consisting of antimony, bismuth, and beryllium, an electrode in contact with said body, another electrode in contact with said film, means to illuminate said device, means to vary the resistance of said semi-transparent film as a function of the distance between said electrode in contact with said film and said illumination, a source of bias voltage, and means connecting said source across said electrodes.

3. An electrical device adapted to be illuminated by a light source comprising a body of semi-conducting material capable of forming a barrier layer at a surface thereof and having on said surface a semi-transparent film of a metal from the class consisting of antimony, bismuth, and beryllium, said film having predetermined resistivity characteristics and adapted to receive light directed towards a portion of its surface, an electrode in contact with said body, two electrodes disposed in parallel relationship, said two electrodes being in electrical contact with said film, said two electrodes lying in the same plane and being separated by said film, the resistance between said portion of film and said two electrodes varying as a function of the distance between said two electrodes and said portion of said film, a source of bias voltage, and means connecting said source across said electrodes.

4. An electrical device adapted to be illuminated by a light source comprising a body of semi-conducting material capable of forming a barrier layer at a surface thereof and having on said surface a semi-transparent film of conductive material, said film having predetermined resistivity characteristics and adapted to receive light directed towards a portion of its surface, an electrode in contact with said body, two electrodes disposed in parallel relationship, said electrodes being in electrical contact with said film, said two electrodes lying in the same plane and being separated by said film, the resistance between said portion of film and said two electrodes varying as a function of the distance between said two electrodes and said portion of said film, a source of bias voltage, and means connecting said source across said electrodes.

5. An electrical device adapted to be illuminated by a light source comprising a body of semi-conducting material capable of forming a barrier layer at a surface thereof and having on said surface a semi-transparent film of gold, said film having predetermined resistivity characteristics and adapted to receive light directed towards a portion of its surface, an electrode in contact with said body, two electrodes disposed in parallel relationship, said electrodes being in electrical contact with said film, said two electrodes lying in the same plane and being separated by said film, the resistance between said portion of film and said two electrodes varying as a function of the distance between said two electrodes and said portion of said film, a source of bias voltage, and means connecting said source across said electrodes.

6. An electrical device adapted to be illuminated by a light source comprising a body of semi-conducting material capable of forming a barrier layer at a surface thereof and having on said surface a semi-transparent film of nickel, said film having predetermined resistivity characteristics and adapted to receive light directed towards a portion of its surface, an electrode in contact with said body, two electrodes disposed in parallel relationship, said electrodes being in electrical contact with said film, said two electrodes lying in the same plane and being separated by said film, the resistance between said portion of film and said two electrodes varying as a function of the distance between said two electrodes and said portion of said film, a source of bias voltage, and means connecting said source across said electrodes.

7. An electrical device adapted to be illuminated by a light source comprising a body of semi-conducting material capable of forming a barrier layer at a surface thereof and having on said surface a semi-transparent film of copper, said film having predetermined resistivity characteristics and adapted to receive light directed towards a portion of its surface, an electrode in contact with said body, two electrodes disposed in parallel relationship, said electrodes being in electrical contact with said film, said two electrodes lying in the same plane and being separated by said film the resistance between said portion of film and said two electrodes varying as a function of the distance between said two electrodes and said portion of said film, a source of bias voltage, and means connecting said source across said electrodes.

8. An electrical device comprising a body of semi-conducting N-type germanium capable of forming a barrier layer at a surface thereof, a light-transmitting film of a metal from the class consisting of antimony, bismuth, and beryllium on said surface of said material, said film having predetermined resistivity characteristics and adapted to receive light directed towards a portion of its surface, a pair of electrodes secured to opposite edge portions of said metal film, a source of potential, said electrodes being electrically connected in parallel to said source of potential, the resistance between said portion of said film and said electrodes varying as a function of distance between said electrodes and said portion of said film, and impedance means for applying a bias voltage between said body and said film.

9. An electrical device comprising a body of semi-conducting material capable of forming a barrier layer at a surface thereof and having on said surface a semi-transparent film of a metal from the class consisting of antimony, bismuth, and beryllium, two wedge-shaped electrodes in contact with said film, another electrode in contact with said body, means to illuminate said device, said resistance of said semi-transparent film being adapted to vary as a function of distance between said wedge-shaped electrodes and said illumination, a source of bias voltage, and means for connecting said source of bias voltage across said electrodes.

10. A photo-conductive device comprising a body of semi-conducting material capable of forming a barrier layer at a surface thereof and having on said surface a semi-transparent film of a metal from the class consisting of antimony, bismuth, and beryllium, an electrode in contact with said body, two parallel disposed electrodes in contact with said film, means providing an opaque insulation disposed on said film between said film and said electrodes, said opaque insulation providing a maximum photo-current versus light beam position output in response to illumination, said insulation providing two substantially opaque parallel portions over said film, means to illuminate said device, a source of bias voltage, and means connecting said source across said electrodes.

11. An electrical device comprising a body of semi-conducting material capable of forming a barrier layer at a surface thereof and having on said surface a semi-transparent film of a metal from the class consisting of antimony, bismuth, and beryllium, an electrode in contact with said body, said semi-transparent film providing a wedge-shaped area of predetermined and variable resistance, an electrode in contact with one edge portion of said film, means to illuminate said device, a source of bias voltage, and means connecting said source across said electrodes.

12. An electrical device comprising a body of semi-conductive material, a light transmitting film having a predetermined resistivity characteristic disposed on one surface of said body, an electrode of conductive material in contact with a surface of said body opposite said one surface, another electrode of conductive material in conductive contact with said film disposed on a portion of said film offset from the center of said one surface, and circuit means interconnecting said electrodes for obtaining output signals from said device.

13. An electrical device comprising a prismoidal body of semi-conducting material, a light transmitting film having a predetermined resistivity characteristic on one surface of said body, an electrode of conductive material secured in contact with said body on a surface thereof opposite from said one surface, another electrode of conductive material in conductive contact with said film along an edge thereof, and circuit means interconnecting said electrodes for providing an output signal from said device.

14. An electrical device comprising a body of N-type germanium having oppositely disposed surfaces, a film of light transmitting metallic material having a predetermined resistivity characteristic disposed on one of said surfaces, an electrode secured in conductive contact with said body on said other surface thereof, another electrode of conductive material disposed in contact only with said film at a portion thereof adjacent an edge of said body, and circuit means including a resistor and a source of voltage interconnecting said electrodes, said resistor providing means for obtaining an output voltage from said device.

15. An electrical device comprising a body of semi-conducting material having oppositely disposed faces, a film of light transmitting material having a predetermined resistivity characteristic disposed on one of said faces to provide a light responsive surface of said device, an electrode of conductive material secured in contact with the entirety of said other face of said body, a pair of electrodes of conductive material disposed in conductive contact with said film at opposite side areas thereof, and circuit means interconnecting said pair of film contacting electrodes and said electrode contacting said other face for providing an output signal from said device.

References Cited in the file of this patent

UNITED STATES PATENTS

| | | |
|---|---|---|
| 2,622,117 | Benzer | Dec. 16, 1952 |
| 2,629,802 | Pantchechnikoff | Feb. 24, 1953 |